United States Patent
Tsirkin et al.

(10) Patent No.: US 10,838,753 B2
(45) Date of Patent: Nov. 17, 2020

(54) EFFICIENT MEMORY DEDUPLICATION BY HYPERVISOR INITIALIZATION

(71) Applicant: Red Hat, Inc., Raleigh, NC (US)

(72) Inventors: Michael Tsirkin, Lexington, MA (US); Karen Lee Noel, Westford, MA (US)

(73) Assignee: Red Hat, Inc., Raleigh, NC (US)

( * ) Notice: Subject to any disclaimer, the term of this patent is extended or adjusted under 35 U.S.C. 154(b) by 134 days.

(21) Appl. No.: 15/901,372

(22) Filed: Feb. 21, 2018

(65) Prior Publication Data

US 2019/0258500 A1    Aug. 22, 2019

(51) Int. Cl.
| | |
|---|---|
| *G06F 9/455* | (2018.01) |
| *G06F 12/06* | (2006.01) |
| *G06F 12/1009* | (2016.01) |
| *G06F 12/1027* | (2016.01) |
| *G06F 16/215* | (2019.01) |

(52) U.S. Cl.
CPC ...... *G06F 9/45558* (2013.01); *G06F 12/0646* (2013.01); *G06F 12/1009* (2013.01); *G06F 12/1027* (2013.01); *G06F 16/215* (2019.01); G06F 2009/45579 (2013.01); G06F 2212/1041 (2013.01); G06F 2212/152 (2013.01); G06F 2212/657 (2013.01)

(58) Field of Classification Search
CPC .................................................. G06F 9/45533
USPC ............................................................ 718/1
See application file for complete search history.

(56) References Cited

U.S. PATENT DOCUMENTS

| | | | |
|---|---|---|---|
| 6,789,156 B1* | 9/2004 | Waldspurger | G06F 12/1018 711/6 |
| 7,237,241 B2* | 6/2007 | Chan | G06F 9/52 718/102 |
| 8,234,655 B2* | 7/2012 | Corry | G06F 9/544 711/148 |
| 9,053,053 B2* | 6/2015 | Bacher | G06F 12/109 |
| 9,424,058 B1* | 8/2016 | Wasson | G06F 9/455 |
| 9,836,241 B1* | 12/2017 | Tsirkin | G06F 12/1408 |
| 9,983,827 B1* | 5/2018 | Tsirkin | G06F 12/1009 |
| 10,404,674 B1* | 9/2019 | Bshara | G06F 9/45558 |
| 2006/0265553 A1* | 11/2006 | Arimilli | G06F 12/0831 711/144 |
| 2009/0083563 A1* | 3/2009 | Murase | G06F 1/3268 713/324 |

(Continued)

OTHER PUBLICATIONS

"Active Memory Deduplication", https://www.ibm.com/support/knowledgecenter/en/linuxonibm/liabd/virtcon-active-memory-deduplication.htm, 1 page.

(Continued)

*Primary Examiner* — Mehran Kamran
(74) *Attorney, Agent, or Firm* — Lowenstein Sandler LLP (57) ABSTRACT

Systems and methods for performing data deduplication of storage units. An example method may comprise: receiving a request to initialize a portion of a data storage; modifying a content of a storage unit to comprise an initialization value; updating, by a processing device, a content indicator to represent the initialization value of the storage unit; determining in view of the content indicator that a plurality of storage units comprise matching content; and updating the storage unit to comprise a reference to the matching content of one of the plurality of storage units that comprise the matching content.

20 Claims, 6 Drawing Sheets

(56) References Cited

U.S. PATENT DOCUMENTS

| | | | | |
|---|---|---|---|---|
| 2010/0031271 | A1* | 2/2010 | Corry | G06F 9/5016 |
| | | | | 719/312 |
| 2010/0161908 | A1* | 6/2010 | Nation | G06F 12/0284 |
| | | | | 711/147 |
| 2011/0055471 | A1* | 3/2011 | Thatcher | G06F 3/0608 |
| | | | | 711/114 |
| 2014/0156866 | A1* | 6/2014 | Kallstrom | H04L 67/06 |
| | | | | 709/232 |
| 2014/0229769 | A1* | 8/2014 | Abraham | G06F 13/102 |
| | | | | 714/43 |
| 2014/0229936 | A1* | 8/2014 | Gaonkar | G06F 9/45558 |
| | | | | 718/1 |
| 2015/0095548 | A1* | 4/2015 | Tsirkin | G06F 9/45545 |
| | | | | 711/6 |
| 2015/0261576 | A1* | 9/2015 | Gong | G06F 9/5016 |
| | | | | 711/6 |
| 2015/0286414 | A1* | 10/2015 | Gordon | G06F 3/0608 |
| | | | | 711/159 |
| 2017/0003886 | A1* | 1/2017 | Mak | G06F 3/0605 |
| 2017/0024246 | A1* | 1/2017 | Gopalan | G06F 9/4856 |
| 2017/0060866 | A1* | 3/2017 | Rudy | G06F 16/2255 |
| 2017/0147518 | A1* | 5/2017 | Gordon | G06F 13/28 |
| 2019/0129633 | A1* | 5/2019 | Wang | G06F 12/0238 |
| 2020/0026781 | A1* | 1/2020 | Khot | G06F 16/1767 |

OTHER PUBLICATIONS

"Patchwork [2/2] X86/Mtrr: Refactor PAT Initialization Code", 2016, https://patchwork.kernel.org/patch/8561891/, 35 pages.

Friedman, Mark, "Hyper-V architecture", Nov. 16, 2015, 10 pages.

* cited by examiner

EFFICIENT MEMORY DEDUPLICATION BY HYPERVISOR INITIALIZATION

TECHNICAL FIELD

The present disclosure is generally related to data storage management, and more particularly, to a data deduplication technique that optimizes storage and processing resources.

BACKGROUND

Modern computer systems often include data storage management features that are designed to enhance the computer system's use of one or more computing resources. The data storage management features may optimize the use of storage resource (e.g., memory, hard disk) and may do so in a manner that optimizes processing resources (e.g., processor cycles). For example, data storage management features may scan a data storage device to identify portions of data that are no longer in use and may remove these portions to optimize storage space or may re-organize the location of the data to optimize access.

BRIEF DESCRIPTION OF THE DRAWINGS

The present disclosure is illustrated by way of examples, and not by way of limitation, and may be more fully understood with references to the following detailed description when considered in connection with the figures, in which.

DETAILED DESCRIPTION

Modern computer systems perform data deduplication to improve the utilization of data storage resources. Data deduplication is a technique that may remove duplicate copies of data and may enable more data to be stored within a data storage device. The technique of data deduplication may involve locking and scanning large portions of data storage to identify redundant chunks of data within the data storage. The redundant chunks may be identified by comparing the data of a first chunk to data of one or more other chunks stored within the data storage. When a match is detected, the computer system may indicate that the chunks are redundant. A redundant chunk may then be modified with a small reference that points to one of the other redundant chunks. The process of locking and scanning the data store may be problematic in some computing environments because it may result in temporarily inaccessible data and may consume a large amount of processing power, which may adversely affect the performance or capacity of the computer system.

Aspects of the present disclosure address the above and other deficiencies by providing technology to perform data deduplication across storage units in a more resource efficient manner. In one example, a computing system may create and update content indicators that represent the content within storage units. The content indicators may be updated when the storage units are initialized, accessed, or modified and may reflect one or more values within the storage units. The content indicators may have a storage size that is much smaller (e.g., one or more bits, bytes, or words) than the portions of data they represent (e.g., 4 KB, 1 GB, 2 GB+). This may enable the computer system to scan and compare the content indicators in a manner that is much more efficient than scanning and comparing the data represented by the content indicators.

In one example, the computer system may perform data deduplication using the enhanced technology disclosed herein. The technology may involve receiving a request to initialize a portion of data storage for use by a requesting entity (e.g., thread, process) and initializing one or more storage units to fulfill the request. During the initialization, the computer system may create or update a content indicator to represent the value of the initialized storage unit. The initialized storage unit may or may not remain locked after the initialization. At any point in time, the computer system may perform data deduplication by accessing the content indicators to identify storage units that have duplicate content. In response to detecting duplicate content, the computer system may update a portion (e.g., reference, pointer) of a first storage unit to point to a second storage unit that has the duplicate content. This may enable the computer system to make the storage resources previously occupied by the first storage unit available to store other data without losing a copy of the data.

The systems and methods described herein include technology that optimizes data deduplication across one or more storage devices. In particular, aspects of the present disclosure may enable a computing system to reduce both processing resources and storage resources used to identify storage units with duplicate content. This may be accomplished by detecting matching content within the storage units by scanning and comparing content indicators instead of scanning and comparing the large portions of data represented by the content indicators. The more efficient use of computing resources may enable the benefits of data deduplication (optimized data storage) to outweigh the performance penalty associated with data deduplication (scanning and comparison penalty). In other aspects of the present disclosure, the data deduplication may be performed on the initialized storage units that remain locked and therefore may reduce the amount of locks being acquired or released during deduplication. In addition, by performing the deduplication on initialized storage units that remain locked the data deduplication may avoid locking and scanning other portions of data storage, which avoids making them temporarily unmodifiable. Any of the aspects discussed above may enable the computer system to reduce the computing resources consumed and therefore may increase the capacity of the computer system.

Various aspects of the above referenced methods and systems are described in details herein below by way of examples, rather than by way of limitation. The examples provided below discuss a hardware-virtualized computer system and the initialization and data deduplication may be performed by aspects of a hypervisor, a host operating system, a virtual machine, or a combination thereof. In another example, the virtualization technology may also or alternatively involve operating-system-level virtualization and may involve one or more containers and docker features. In other examples, the data deduplication may be performed in a non-virtualized computer system that is absent a hypervisor, docker, or other virtualization features discussed below.

Figure 1:
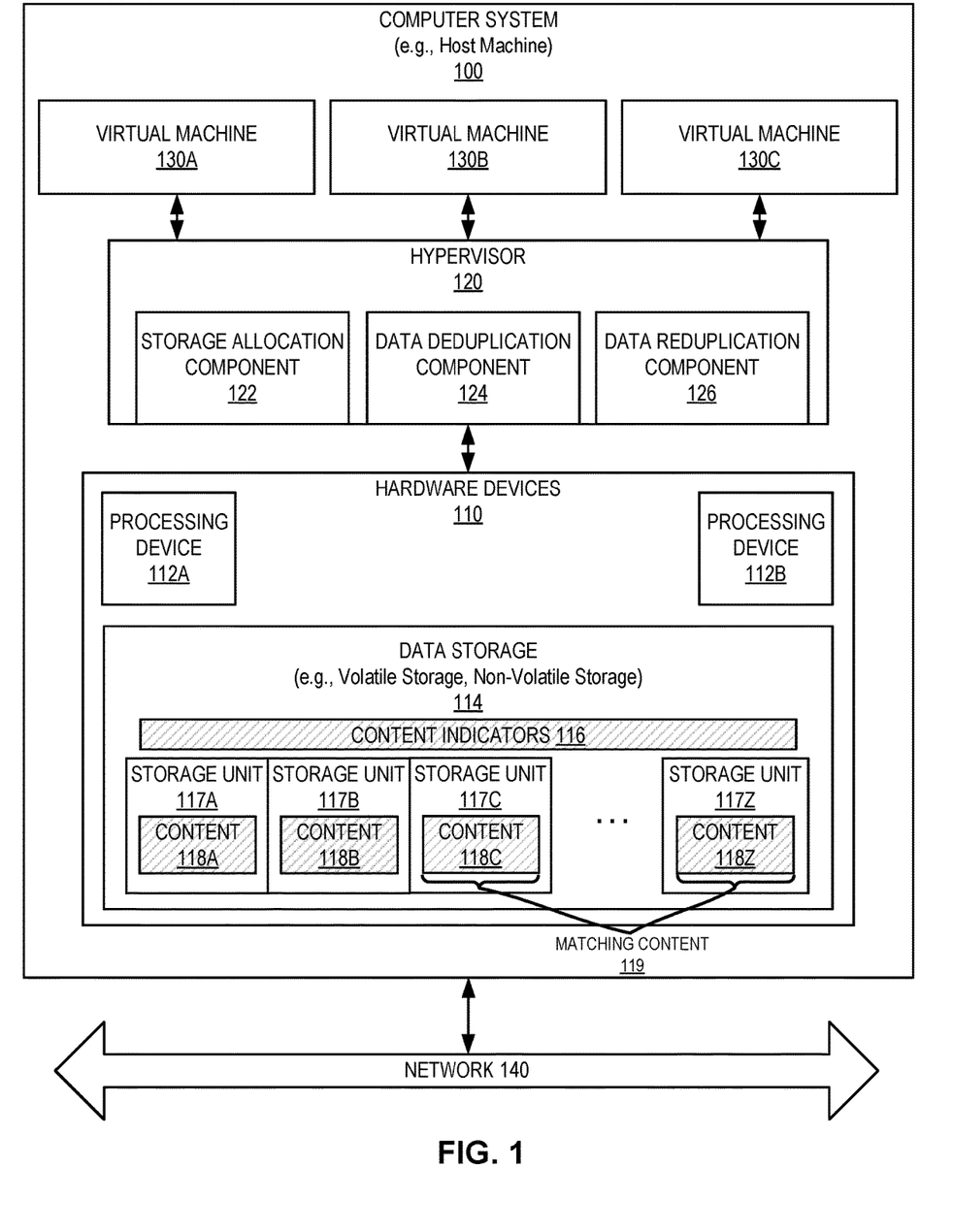
FIG. 1 depicts a high-level block diagram of an example computer system architecture that performs deduplication of data using one or more content indicators, in accordance with one or more aspects of the present disclosure.

FIG. 1 depicts an illustrative architecture of elements of a computer system 100, in accordance with an embodiment of the present disclosure. It should be noted that other architectures for computer system 100 are possible, and that the implementation of a computer system utilizing embodiments of the disclosure are not necessarily limited to the specific architecture depicted.

Computer system 100 may be a single host machine or multiple host machines arranged in a heterogeneous or homogenous group (e.g., cluster) and may include one or more rack mounted servers, workstations, desktop computers, notebook computers, tablet computers, mobile phones, palm-sized computing devices, personal digital assistants (PDAs), etc. In one example, computer system 100 may be a computing device implemented with x86 hardware. In another example, computer system 100 may be a computing device implemented with PowerPC®, SPARC®, or other hardware. In the example shown in FIG. 1, computer system 100 may include hardware devices 110, a hypervisor 120, virtual machines 130A-C, and a network 140.

Hardware devices 110 may provide hardware functionality for performing computing tasks. Hardware devices 110 may include one or more processing devices 112A, 112B, one or more data storages 114, other computing devices, or a combination thereof. One or more of hardware devices 110 may be split into multiple separate devices or consolidated into one or more hardware devices. Some of the hardware device shown may be absent from hardware devices 110 and may instead be partially or completely emulated by executable code.

Processing devices 112A and 112B may include one or more processors that are capable of executing the computing tasks discussed above in regards to components 122, 124 and 126. Processing devices 112A and 112B may be a single core processor that is capable of executing one instruction at a time (e.g., single pipeline of instructions) or may be a multi-core processor that simultaneously executes multiple instructions. The instructions may encode arithmetic, logical, or I/O operations on data within data storage 114.

Data storage 114 may include volatile or non-volatile data storage. Volatile data storage (e.g., non-persistent storage) may store data for any duration of time but may lose the data after a power cycle or loss of power. Non-volatile data storage (e.g., persistent storage) may store data for any duration of time and may retain the data beyond a power cycle or loss of power. In one example, data storage 114 may include one or more memory devices (e.g., main memory). In another example, data storage 114 may include one or more mass storage devices, such as hard drives, solid-state storage (e.g., solid state drives (SSD)), other data storage devices, or a combination thereof. In a further example, data storage 114 may include a combination of one or more processor registers, one or more memory devices, one or more mass storage devices, other data storage devices, or a combination thereof and may be arranged in a cache hierarchy. Data storage 114 may be organized into one or more storage units 117A-Z.

Storage units 117A-Z may be any physical data storage or logical data storage for storing, organizing, or accessing data. Each of the storage units 117A-Z may include a contiguous or non-contiguous sequence of bits or bytes. A storage unit may have a block size that is the same or different from a physical block size of an underlying hardware storage device. The block size may be a fixed-size, such as a particular integer value (e.g., 4 KB) or may be a variable-size that varies within a range of integer values. Each of the storage units 117A-Z may have the same size or a different size in comparison to an adjacent storage unit. In one example, storage units 117A-Z may be portions of memory and each storage unit may correspond to one or more memory pages or memory blocks respectively. In another example, each of the storage units 117A-Z may correspond to a portion (e.g., sector, block) of a mass storage device (e.g., hard disk) or other storage device.

Each of the storage units 117A-Z may be a virtual storage unit that references one or more physical storage units. The virtual storage units may include a reference that points to a physical storage unit and may be used to abstract the locations (e.g., hardware addresses) of the physical storage units. The virtual storage units may be virtual memory pages and may each include a reference to one or more physical memory block. The virtual memory may be associated with guest memory of a virtual machine or host memory of the hypervisor. Collectively the virtual storage units and physical storage units may be organized or arranged to store content A-Z.

Content 118A-Z may represent the data that is stored within storage units 117A-Z. The content may include any form of digital data, analog data, other data, or a combination thereof. In the example shown in FIG. 1, the size of content 118A-Z may be smaller than the size of the respective storage unit 117A-Z. This may occur because a portion of the storage unit may remain unused, store remnant data from earlier use, may store metadata (e.g., dirty bits, flags), other data, or a combination thereof. In other examples, an instance of content may have a size equal to the size of the particular storage unit or may have a size larger than the particular storage unit because it spans multiple storage units. Each instance of content may evaluate to a set of one or more values and the values may be represented by content indicators 116A-Z.

Content indicators 116A-Z may include one or more data structures that indicate the value of the content of one or more storage units 117A-Z. Each content indicator may include one or more bits, bytes, words, or other data size that is capable of representing a storage unit with a much larger data size. For example, a content indicator that is a single bit or a single byte may indicate a value of content that is one or more kilobytes. In one example, each content indicator 116 may represent a state (e.g., true/false) corresponding to a particular value. In other examples, the content indicator may include data representative of a data pattern that may or may not be repeated within the content. These examples and others are discussed in more detail below in regards to FIG. 2.

Hypervisor 120 may also be known as a virtual machine monitor (VMM) and may provide virtual machines 130A-C with access to one or more features of the underlying hardware. In the example shown, hypervisor 120 may run directly on the hardware of computer system 100 (e.g., bare metal hypervisor). In other examples, hypervisor 120 may run on or within a host operating system (not shown). Hypervisor 120 may manage system resources, including access to hardware devices 110. In the example shown, hypervisor 120 may include a storage allocation component 122, a data deduplication component 124, and a data reduplication component 126. Components 122, 124, and 126 may each be separated into one or more components or may be included within the same component.

Storage allocation component 122 may analyze data storage 114 to identify portions of data storage 114 that can be allocated for use by a requesting entity. The requesting entity may be a thread, process, or hardware device associated with computer system 100 or associated with another computer system. Storage allocation component 122 may enable computer system 100 to identify and initialize one or more storage units 117A-Z to fulfill the allocation request. Computer system 100 may create, access, or update a content indicator before, during, or after modifying (e.g., initializing) one of the respective storage units 117A-Z.

Data deduplication component 124 may analyze content indicators 116A-Z to determine whether one or more storage units 117A-Z contain duplicate content. The duplicate content is illustrated by matching content 119 and may be redundant data that is consolidated or merged. Data deduplication component 124 may consolidate or merge duplicate content by reconfiguring references that point to the duplicate content to subsequently point to a single copy of the content. For example, data deduplication component 124 may update one or more references (e.g., internal pointers) of a first storage unit to point to the underlying data storage of a second storage unit that contains matching data. Data deduplication component 124 may then update the data storage to release (e.g., free, remove) the duplicate content of the first storage unit.

Data reduplication component 126 may enable data that was deduplicated to be subsequently reduplicated so that it can be modified. When data is deduplicated it may be consolidated into one or more storage units that are locked (e.g., restricted access, write protected, read-only) and data reduplication component 126 may separate the data to enable the storage units to be modified independent of one another. The features of storage allocation component 122, data deduplication component 124, and data reduplication component 126 are discussed in more detail below in regards to FIG. 2.

Virtual machines 130A-C may execute guest executable code that uses an underlying emulation of physical resources. The guest executable code may include a guest operating system, guest applications, guest device drivers, etc. Each of the virtual machines 130A-C may support hardware emulation, full virtualization, para-virtualization, operating system-level virtualization, or a combination thereof. Virtual machines 130A-C may have the same or different types of guest operating systems, such as Microsoft®, Windows®, Linux®, Solaris®, etc.

Network 140 may be a public network (e.g., the internet), a private network (e.g., a local area network (LAN) or wide area network (WAN)), or a combination thereof. In one example, network 140 may include a wired or a wireless infrastructure, which may be provided by one or more wireless communications systems, such as a wireless fidelity (WiFi) hotspot connected with the network 140 and/or a wireless carrier system that can be implemented using various data processing equipment, communication towers, etc.

Figure 2:
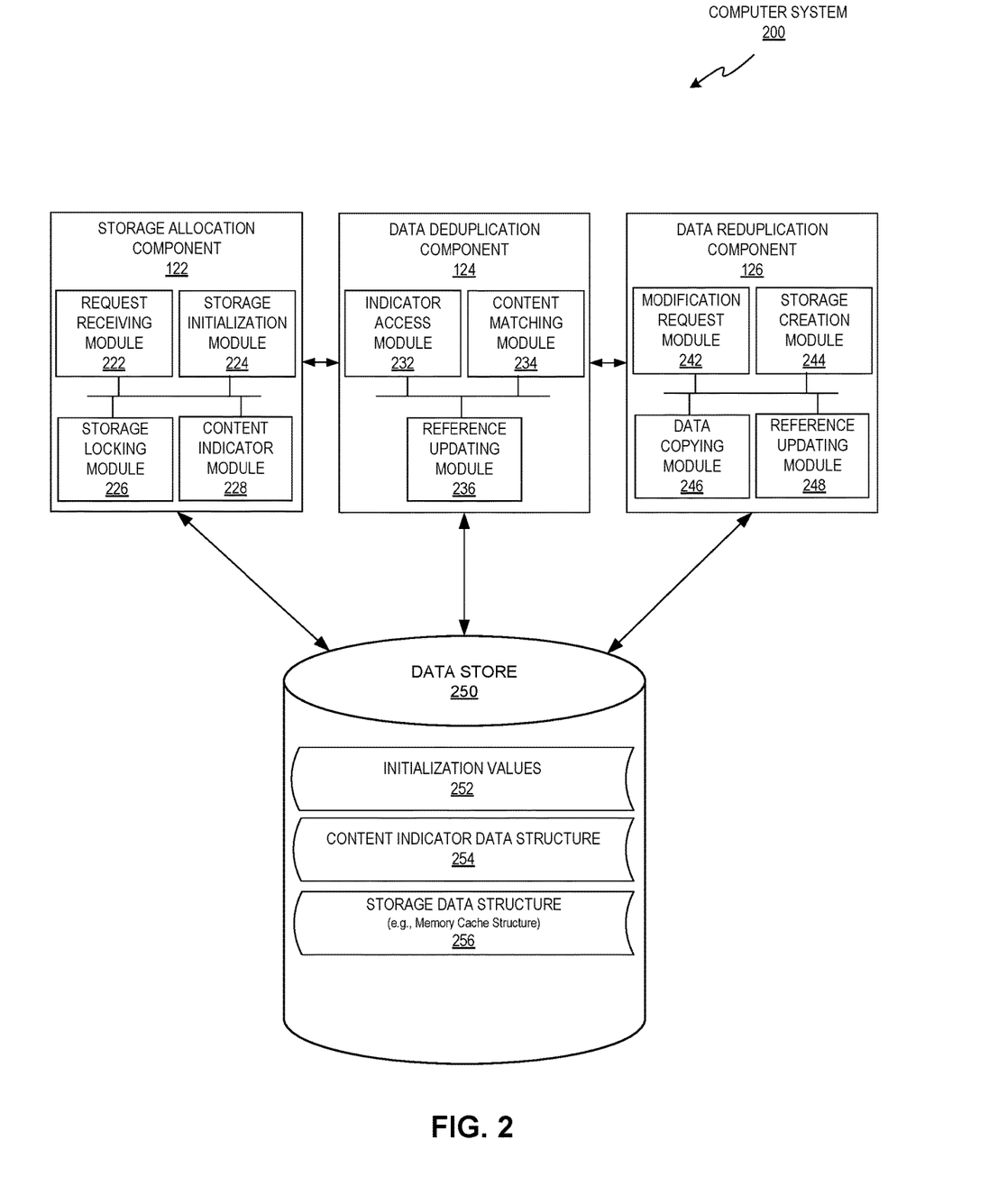
FIG. 2 depicts a block diagram illustrating components and modules of an example computer system, in accordance with one or more aspects of the present disclosure.

FIG. 2 is a block diagram illustrating example components and modules of computer system 200, in accordance with one or more aspects of the present disclosure. In one example, a computing environment may include hardware virtualization technology and computer system 200 may be a hypervisor or a host operating system. In another example, the computing environment may not provide hardware virtualization technology and computer system 200 may be the kernel of an operating system. In either example, computer system 200 may include a storage allocation component 122, a data deduplication component 124, and a data reduplication component 126, which may be the same or similar to corresponding components of FIG. 1.

Storage allocation component 122 may analyze data storage to identify portions of the data storage that can be allocated for use by another computing entity. Allocating storage may be the same or similar to assigning, creating, sharing, or designating data storage for use by the computing entity. In one example, storage allocation component 122 may have a request receiving module 222, a storage initialization module 224, a storage locking module 226, and a content indicator module 228.

Request receiving module 222 may receive a request to initialize a portion of data storage for use by a computing entity. The computing entity may be a thread, a process, other computing stream, or a combination thereof that is executing on the same physical computing device (e.g., server device, client device) or on a different physical computing device. In one example, request receiving module 222 may enable a hypervisor to receive and process storage initialization requests from a virtual machine managed by the hypervisor. The request to initialize may be a part of an allocation request originating from the virtual machine, hypervisor, host operating system, hardware device, or a combination thereof. In another example, request receiving module 222 may enable a kernel of an operating system to receive and process storage initialization requests from an application process managed by the operating system. In either example, the request may identify information related to the initialization request, such as, data about the requesting entity, data about the data storage (e.g., size, location, use), and data for initializing the data storage (e.g., initialization values 252).

Initialization values 252 may be data that is used to initialize the allocated portion of data storage. An initialization value may be provided by the requesting entity (e.g., virtual machine) as discussed above or it may be provided by the entity that is allocating the data storage (e.g., hypervisor or host operating system). Initialization values 252 may be stored in data store 250 and used to determine one or more values to be assigned to the portion of data storage. The values may be assigned before, during, or after the portion of data storage is provided to the requesting entity. The data storage may be used by multiple different computing entities and when the data storage is freed by a first entity it may be reused by a second entity. When the data storage is reused, the data stored by the first entity may remain in the data storage after being allocated to the second computing entity. This may be referred to as leftover data and may be overwritten by storage initialization module 224.

Storage initialization module 224 may modify the content of the allocated data storage in view of initialization values 252. The modification may involve assigning a particular value indicated by initialization values 252 to one or more storage units of the allocated portion of data storage. In one example, storage initialization module 224 may modify the content to include the initialization value in response to the initialization request and prior to responding to the initialization request. In another example, storage initialization module 224 may modify the content after responding to the request with the allocated storage units. For example, storage initialization module 224 may modify the content of a particular storage unit after allocating the storage unit to the requesting entity. This may be referred to a delayed initialization or lazy initialization and may occur at any point before the requesting entity accesses (e.g., reads or writes) the particular allocated storage unit. The modification of the content may be a part of a clean, wipe, or other operation.

Storage locking module 226 may lock a storage unit after the storage unit is initialized. Locking the storage unit may involve restricting access of the requesting entity and one or more other entities to the storage unit. Restricting access to a storage unit may involve restricting read access, write access, other access, or a combination thereof. In one example, locking the storage unit may involve write protecting the storage unit so that an entity is able to read the storage unit but may not be able to write to (e.g., modify) the storage unit. Locking a storage unit may enable the computing system 200 to ensure that the initialized value of the storage unit remains unchanged until a subsequent modification request is received and processed (e.g., reduplication).

Content indicator module 228 may update one or more content indicator data structures 254 to represent the initialized content of the allocated data storage. Content indicator data structure 254 may be any data structure that stores data capable of indicating one or more values of an initialized storage unit. Content indicator data structure 254 may include one or more bit stores, arrays, pointers, other data structures, or a combination thereof. In one example, content indicator data structure 254 may represent one or more states (e.g., true/false) that correspond to a particular value of a storage unit. In another example, the content indicator data structure 254 may include data representative of a data pattern of the content of the storage unit. In other examples, content indicator data structure 254 may include data that represents states, data patterns, other arrangements, or a combination thereof.

The content indicator data structures that represent states may include data (e.g., bits) that indicate multiple states of content of a storage unit. Each state may correspond to a particular value or a particular set of values of a storage unit. For example, a content indicator data structure 254 may be a single bit store (e.g., bit flag) that represents two states. A first state (e.g., true) may indicate that the content of a storage unit has a particular value and the second state (e.g., false) may indicate the content of the storage unit does not have the particular value. Content indicator data structure 254 may alternatively represent more than two states (e.g., 3, 4, 5+) of a particular storage unit. The first state may represent a first known value (e.g., all '0' bit values), a second state may represent a second known value (e.g., all '1' bit values), and another state may indicate the content has an unknown value (e.g., none of the preceding content values). In either example, content indicator data structure may include a reference to or data (e.g., value) of the one or more particular known values.

The content indicator data structures that represent data patterns (as opposed to states) may include data that is replicated within the content. In one example, when the content of a storage unit comprises only "zero bits" (e.g., 4 KB of repeating zeros) or "one bits" (e.g., 4 KB of repeating ones) the content indicator may be a single bit with a value of zero or one respectively. In another example, the content of a storage unit may include a single instance of the repeating data and the single instance may include a plurality of bits (e.g., 01 or 10), one or more bytes (e.g., 0xA, 0xAF), or other quantity. In other examples, content indicator data structure may represent data for one or more mathematical functions (e.g., coefficient values) that once expanded represent the content of one or more storage units 117A-Z.

Data deduplication component 124 may access content indicator data structures 254 to detect and deduplicate storage units that have content that matches the content of another storage unit. In one example, data deduplication component 124 may include an indicator access module 232, a content matching module 254, and a reference updating module 236.

Indicator access module 232 may access one or more content indicator data structures 254 created or updated by storage initialization component 122. The content indicator data structures may be stored at a location that is separate from where the content of the storage units are stored. This may result in the content indicator data structures being accessible by computer system 200 (e.g., a hypervisor or operating system) without being accessible to the entity requesting the storage initialization (e.g., virtual machine or application). For example, when a storage unit is a memory page the content indicator may be stored at a location in data storage that is separate from the content of the storage unit, such as within or associated with a storage data structure 256 (e.g., memory cache structure).

Indicator access module 232 may access a content indicator data structure by accessing a particular location (e.g., element/bit flag) within another content indicator data structure 254. This may occur when content indicator data structure 254 includes a set of one or more content indicator data structures and represents content values for a plurality of storage units. In one example, content indicator data structure 254 may be an array (e.g., bit map) of elements that each includes a content indicator data structure (e.g., bit flag). Each element of the array may correspond to a single storage unit and represent the value of the content in the single storage unit via the states or data patterns discussed above.

Content matching module 254 may determine in view of one or more content indicators that a plurality of storage units include matching content. Content matching module 254 may analyze the values of the content indicators to determine the values of the corresponding storage units. As discussed above, content indicators that match may indicate that the corresponding storage units have matching content. Content matching module 254 may identify matching content indicators by comparing a value of a content indicator (e.g., state or data pattern) with values of one or more other content indicators. As discussed above, the content indicators may have a data size (e.g., one or more bits) that represent storage unit content that has a much larger data size (e.g., 4 KB, 1 GB). Therefore, the use of content indicators may be advantageous because it enables computer system 200 to compare the content of storage units indirectly by using the content indicators, which may be orders of magnitude more efficient (less processor cycles, less time) than directly comparing the contents of multiple storage units. Once matching content indicators are identified, content matching module 254 may store an indication of which storage units contain matching content. The content within storage units may be considered matching even though they are not identical since storage units may include additional content (e.g., unused space, padding, metadata).

Content matching module 254 may scan some or all of the content indicators to identify matches. In one example, content matching module 254 may perform an exhaustive search of a set of all content indicators to find matching storage units. In another example, content matching module 254 may search a subset of the content indicators. The subset may be selected by analyzing data associated with one or more storage units to identify storage units that have an increased probability of containing duplicate data. The data associated with the storage units may be any data that relates to a particular storage unit or group of storage units and may include temporal data, spatial data, contextual data, other data, or a combination thereof. The temporal data associated with a storage unit may be any data related to a time or frequency of creation, initialization, modification, deletion, or other operation that affects the one or more storage units. The spatial data may be any data that relates to the location of one or more storage units with respect to the data storage. The locations may be a particular location (e.g., address) or a relative location (e.g., adjacent to) and may include logical locations (e.g., virtual address or address range) or physical locations (e.g., physical address or address range) of the storage unit. The contextual data may be any data that provides a context of a storage unit or content within the storage unit and may indicate a particular thread, process, user, device, host, hypervisor, virtual machine, other entity or a combination thereof, that requested, initiated, or allocated the storage unit.

The temporal data, spatial data, or contextual data associated with the storage units may be analyzed and or weighted to calculate a similarity score. The similarity score may be a probabilistic value that indicates the probability that separate storage units or groups of storage units include the same or similar content data. The probabilistic value may be represented in any form such as decimals, fractions, percentages, ratios, other forms, or combination thereof. Storage allocation component 122 or data deduplication component 124 may select one or more storage units in view of the similarity score. For example, content matching module 254 may select one or more storage units that satisfy (e.g., above or below) a predetermined threshold and may indicate these storage units may be processed by reference updating module 236.

Reference updating module 236 may access data generated by content matching module 254 and may update a storage data structure 256 to consolidate one or more storage units that have duplicate content. Storage data structure 256 may include one or more references that correspond to one or more storage units. Each reference may identify (e.g., point to) the beginning, middle, end, or other portion of the one or more underlying physical storage units. When a first storage unit and a second storage unit (e.g., first and second virtual storage units) are determined to be duplicates, reference updating module 236 may update the storage data structure 256 to change a reference (e.g., internal pointer) of the first storage unit to subsequently reference the underlying physical storage unit of the second storage unit. As a result, the references for the first storage unit and the second storage unit may point to the identical physical storage unit. This may effectively remove or free data storage by de-referencing the physical storage unit corresponding to the first storage unit so that it can be subsequently reused, reallocated, flushed, wiped, or other action.

Storage data structure 256 may be a memory cache data structure or it may be another storage data structure that corresponds to a caching system, a file system, a database system, other storage system, or a combination thereof. In one example, storage data structure 256 may be an address-translation cache (e.g., Translation Lookaside Buffer (TLB)) that translates between virtual storage units (e.g., virtual memory locations) and physical storage units (e.g., physical memory locations). The memory cache data structure may include one or more pointer entries (e.g., Page Table Entries (PTE)) that point to respective physical storage units (e.g., memory blocks). After detecting duplicates, reference updating module 236 may update the memory cache data structure by invalidating the pointer entries for one or more of the duplicate storage units and may flush the address-translation cache to remove references or content of the duplicates.

Data reduplication component 126 may enable data that was deduplicated to be reduplicated for subsequent modification. When data is deduplicated it may be consolidated into one or more storage units that are read-only and data reduplication component 126 may duplicate the data to enable the storage units to be modified independent of one another. In one example, data reduplication component 126 may include a modification request module 242, a storage creation module 244, a data copying module 246, and a reference updating module 248.

Modification request module 242 may receive a request to modify a storage unit that was consolidated by data deduplication component 124. The modification request may include storage unit identification data, modification data, other data, or a combination thereof. The storage unit identification data may be used to determine one or more storage units. The modification data may identify an operation or instruction for modifying the data. The request may be received by a kernel (e.g., host operating system, hypervisor) from upper-level executable code (e.g., virtual machine, application). In one example, the kernel may be a hypervisor and the hypervisor may receive the request from a guest operating system or guest application executing on the virtual machine. In another example, the kernel may be a part of a host operating system and the request may originate from the hypervisor or virtual machine. In other examples, the kernel may provide operating system level virtualization (e.g., container platform) and may receive the request from a container managed by an operating system level virtualization layer.

Storage creation module 244 may allocate data storage to store a copy of the deduplicated content. The deduplicated content may be stored at a first storage location and storage creation module 244 may allocate storage at a second storage location. The first and second storage locations may be logical locations or physical locations that are on the same storage device or on different storage devices. In one example, the first storage location may be associated with a first memory block (e.g., first physical storage unit) and the second storage location may be associated with a second memory block (e.g., second physical storage unit). The first and second memory blocks may be on the same or different memory devices. The different memory devices may be memory devices that were or were not manufactured separately and may be associated with the same caching level (e.g., main memory) of a cache hierarchy.

Data copying module 246 may update one or more storage devices by copying the content to the newly allocated or previously existing second storage location. Copying data of a storage unit between storage locations may involve copying digital content of the entire storage unit or just a portion of the storage unit.

Reference updating module 248 may be the same or similar to reference updating module 236 but may perform tasks to reduplicate, as opposed to deduplicate storage units. Reference updating module 258 may update storage data structure 256 to update a reference that points to the original data storage to subsequently point to the new data storage. This may be advantageous because the original data storage may comprise read-only data (e.g., deduplicated data) and the new data storage may comprise data that is modifiable (e.g., reduplicated data). When the storage units are portions of memory (e.g., memory pages), reference updating module 248 may update multiple separate storage data structures corresponding to the virtual machine, hypervisor, or host operating system. For example, there may be a first storage data structure that corresponds to the host memory and may be maintained by the hypervisor and there may be a second storage data structure that corresponds to guest memory of the virtual machine and may be maintained by the virtual machine. The host memory may correspond to physical memory (e.g., main memory) of the host and the guest memory may correspond to what appears to the virtual machine as its portion of physical memory (e.g., guest physical memory).

Figure 3:
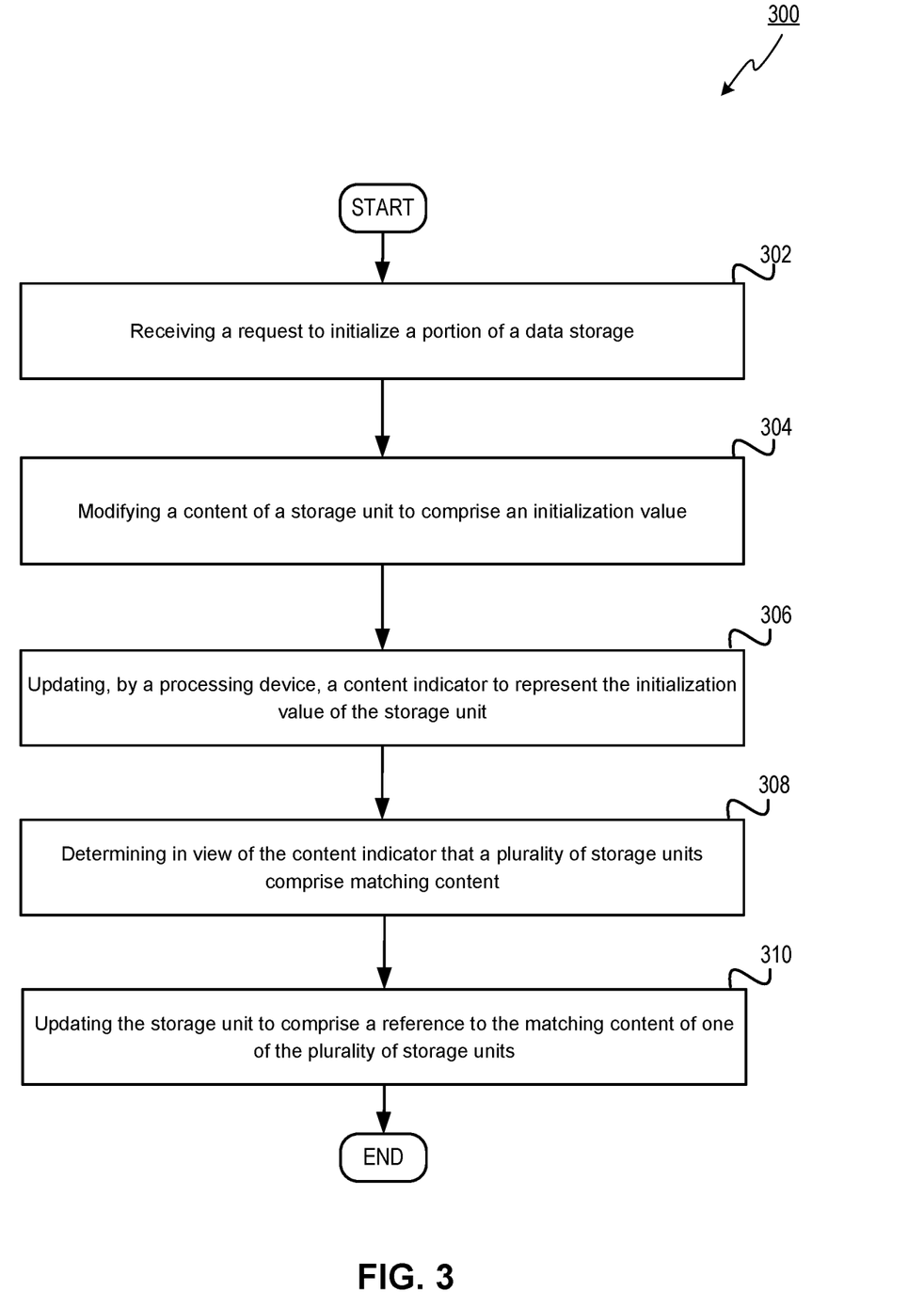
FIG. 3 depicts a flow diagram of an example method for performing data deduplication using content indicators, in accordance with one or more aspects of the present disclosure.

FIG. 3 depicts a flow diagram of one illustrative example of a method 300 for utilizing sequence identifiers to reduce spurious wakeups, in accordance with one or more aspects of the present disclosure. Method 300 and each of its individual functions, routines, subroutines, or operations may be performed by one or more processors of the computer device executing the method. In certain implementations, method 300 may be performed by a single processing thread. Alternatively, methods 300 may be performed by two or more processing threads, each thread executing one or more individual functions, routines, subroutines, or operations of the method. In an illustrative example, the processing threads implementing methods 300 may be synchronized (e.g., using semaphores, critical sections, and/or other thread synchronization mechanisms). Alternatively, the processes implementing method 300 may be executed asynchronously with respect to each other.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media. In one implementation, method 300 may be performed by computer system 100 or 200 as shown in FIGS. 1 and 2 respectively.

Method 300 may be performed by processing devices of a server device or a client device and may begin at block 302. At block 302, the processing device may receive a request to initialize a portion of data storage. The data storage may include one or more volatile memory devices or non-volatile memory devices. In one example, receiving the request to initialize the portion of the data storage comprises receiving, by a hypervisor, a request from a virtual machine to provide memory storage to the virtual machine, wherein the hypervisor stores the content indicator in data storage that is inaccessible to the virtual machine. The data storage may be guest memory and may include storage units in the form of guest memory pages.

At block 304, the processing device may modify a content of a storage unit to comprise an initialization value. The initialization value may be provided by a virtual machine, a hypervisor, a hardware device (e.g., hardware configuration), or a combination thereof. Modifying the content of the storage unit may involve assigning a default value to the content of the storage unit and subsequently creating a content indicator that indicates the storage unit includes the default value. In one example, modifying the content to comprise the initialization value comprises initializing the content of the storage unit prior to responding to the request to initialize the portion of the data storage. In another example, modifying the content to comprise the initialization value comprises initializing the content of the storage unit after responding to the request with the updated reference to the storage unit. After modifying the content to include the initialization value, the processing device may lock (e.g., write protect) the storage unit and respond to the request to initialize the portion of data storage with a reference to the locked storage unit.

At block 306, the processing device may update a content indicator to represent the initialization value of the content of the storage unit. The content indicator may be stored at a location in data storage that is separate from the content of the storage unit. In one example, the content indicator comprises a binary indicator that indicates whether the content of the storage unit comprises the initialization value, wherein the initialization value comprises multiple bits that all comprise zeros. In another example, the content indicator comprises a data pattern and the content of the storage unit comprises multiple instances of the data pattern. The data pattern may include a bit value, a hexadecimal value, or a word value. In either example, updating the content indicator to represent the initialization value may occur prior to responding to the request to initialize the portion of data storage.

At block 308, the processing device may determine in view of the content indicator that a plurality of storage units include matching content. The determination may involve analyzing the values of the content indicators to determine the values of the corresponding storage units match. The processing device may first identify matching content indicators by comparing a value of a content indicator (e.g., state or data pattern) with values of one or more other content indicators. Once matching content indicators are identified, content matching module 254 may store an indication of which storage units contain matching content. The content within storage units may be considered matching even though they may not have identical data since storage units may include additional content (e.g., unused space, padding, metadata). In one example, the determination may involve analyzing (e.g., scanning/comparing) content indicators of the storage units without accessing (e.g., scanning/comparing) content of the plurality of storage units.

At block 310, the processing device may update the storage unit to include a reference to the matching content of one of the plurality of storage units. The plurality of storage units that comprise the matching content may be duplicate memory pages and updating the storage unit to comprise the reference to the matching content may reduce the data storage occupied by the duplicate memory pages. Updating the reference may involve replacing the reference (e.g., internal pointer) of the storage unit with a reference that points to the underlying content (e.g., physical storage location) of one of the plurality of storage units that comprise the matching content. In one example, the storage unit may be a virtual storage unit that references a physical storage unit, and wherein updating the storage unit to comprise a reference to the matching content comprises updating the virtual storage unit to reference a physical storage unit of the one of the plurality of storage units that comprises the matching content. When the storage units comprise guest memory pages, updating the reference of the storage unit may involve updating a guest memory page from a first address in a host memory to a second address in the host memory, wherein the second address corresponds to the one of the plurality of storage units that comprise the matching content. In one example, updating the reference of the storage unit may also or alternatively involve updating a page table entry and invalidating a corresponding entry within a translation lookaside buffer, wherein the page table entry corresponds to the storage unit and after the invalidating comprises a pointer to a physical address of the one of the plurality of storage units that comprise the matching content. Responsive to completing the operations described herein above with references to block 310, the method may terminate.

Figure 4:
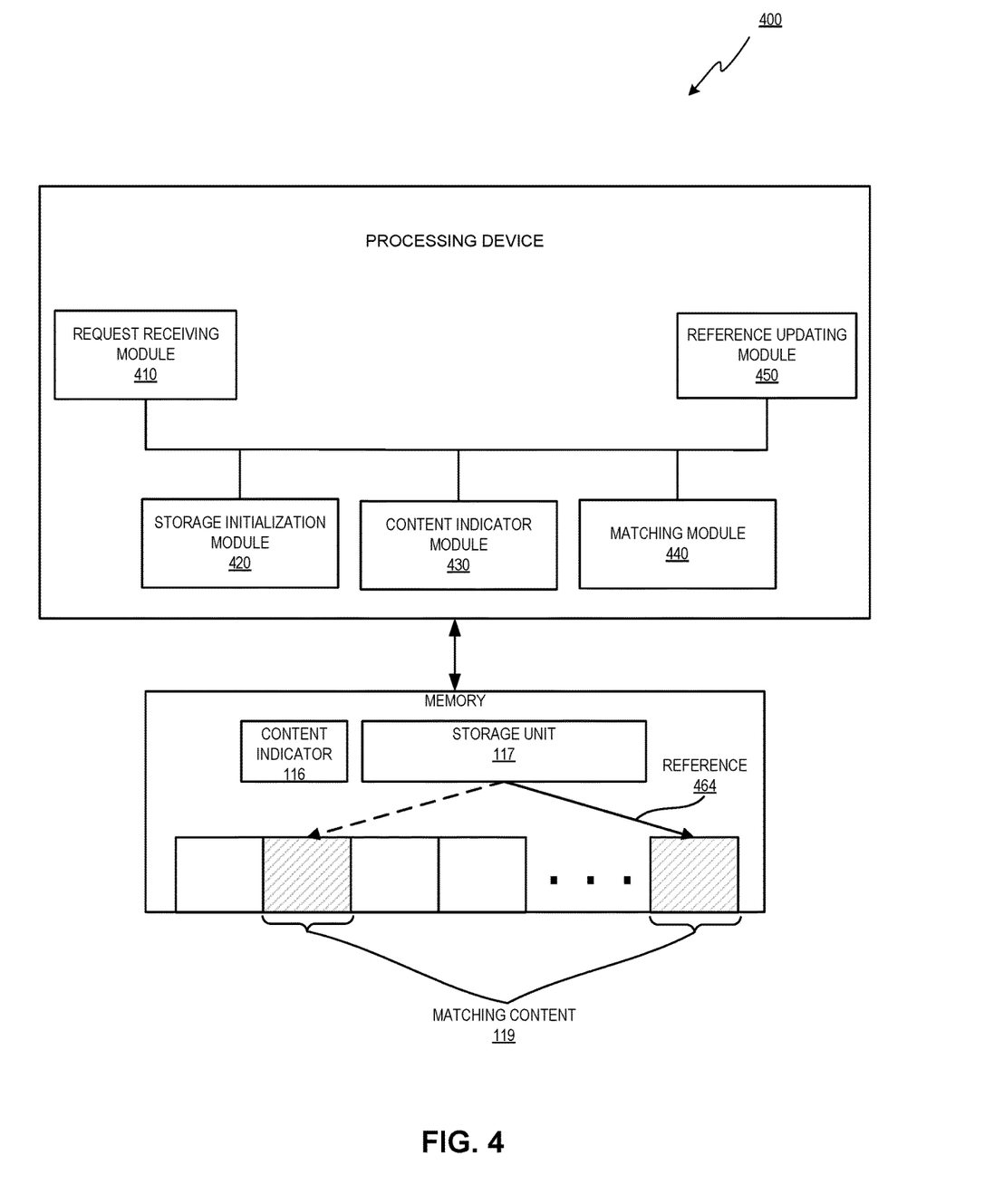
FIG. 4 depicts a block diagram of an example computer system in accordance with one or more aspects of the present disclosure.

FIG. 4 depicts a block diagram of a computer system 400 operating in accordance with one or more aspects of the present disclosure. Computer system 400 may be the same or similar to computer system 100 and 200 and may include one or more processing devices and one or more memory devices. In the example shown, computer system 400 may include a request receiving module 410, a storage initialization module 420, a content indicator module 430, a matching module 440, and a reference updating module 450.

Request receiving module 410 may enable a processing device to receive a request to initialize a portion of data storage. The data storage may include one or more volatile memory devices or non-volatile memory devices. In one example, receiving the request to initialize the portion of the data storage comprises receiving, by the processing device while executing a hypervisor, a request from a virtual machine to provide memory storage to the virtual machine, wherein the hypervisor stores the content indicator in data storage that is inaccessible to the virtual machine. The data storage may be guest memory and may include storage units in the form of guest memory pages.

Storage initialization module 420 may enable the processing device to modify a content of a storage unit 117 to comprise an initialization value. The initialization value may be provided by a virtual machine, a hypervisor, a hardware device (e.g., hardware configuration), or a combination thereof. Modifying the content of storage unit 117 may involve assigning a default value to the content of storage unit 117 and subsequently creating a content indicator that indicates storage unit 117 includes the default value. In one example, modifying the content to comprise the initialization value comprises initializing the content of storage unit 117 prior to responding to the request to initialize the portion of the data storage. In another example, modifying the content to comprise the initialization value comprises initializing the content of storage unit 117 after responding to the request with the updated reference to the storage unit. After modifying the content to include the initialization value, the processing device may lock (e.g., write protect) storage unit 117 and respond to the request to initialize the portion of data storage with a reference to the locked storage unit 117.

Content indicator module 430 may enable the processing device to update a content indicator 116 to represent the initialization value of the content of storage unit 117. Content indicator 116 may be stored at a location in data storage that is separate from the content of storage unit 117. In one example, content indicator 116 comprises a binary indicator that indicates whether the content of storage unit 117 comprises the initialization value. The initialization value may include multiple bits that all comprise zeros. In another example, content indicator 116 may include a data pattern and the content of storage unit 117 may include multiple instances of the data pattern. The data pattern may include a bit value, a hexadecimal value, or a word value. In either example, updating content indicator 116 to represent the initialization value may occur prior to responding to the request to initialize the portion of data storage.

Matching module 440 may enable the processing device to determine in view of the content indicator 116 that a plurality of storage units include matching content 119. The determination may involve analyzing the values of multiple content indicators to determine the values of the corresponding storage units match. The processing device may first identify matching content indicators by comparing a value of content indicator 116 (e.g., state or data pattern) with values of one or more other content indicators. Once matching content indicators are identified, the processing device may store an indication of which storage units contain matching content 119. The content within storage units may be considered matching even though they may not have identical data since storage units may include additional content (e.g., unused space, padding, metadata). In one example, the determination may involve analyzing (e.g., scanning/comparing) content indicators of the storage units without accessing (e.g., scanning/comparing) content of the plurality of storage units.

Reference updating module 450 may enable the processing device to update storage unit 117 to include a reference 464 to the matching content of one of the plurality of storage units. The plurality of storage units that comprise the matching content may be duplicate memory pages and updating the storage unit to comprise the reference to the matching content may reduce the data storage occupied by the duplicate memory pages. Updating reference 464 may involve replacing a reference (e.g., internal pointer) of the storage unit 117 with a reference 464 that points to the underlying content (e.g., physical storage location) of one of the plurality of storage units that comprise the matching content. In one example, the storage unit may be a virtual storage unit that references a physical storage unit, and wherein updating the storage unit to comprise a reference to the matching content comprises updating the virtual storage unit to reference a physical storage unit of the one of the plurality of storage units that comprises the matching content. When the storage units comprise guest memory pages, updating the reference of the storage unit 117 may involve updating a guest memory page from a first address in a host memory to a second address in the host memory, wherein the second address corresponds to the one of the plurality of storage units that comprise matching content 119. In one example, updating the reference of the storage unit may also or alternatively involve updating a page table entry and invalidating a corresponding entry within a translation lookaside buffer, wherein the page table entry corresponds to the storage unit and after the invalidating comprises a pointer to a physical address of the one of the plurality of storage units that comprise matching content 119.

Figure 5:
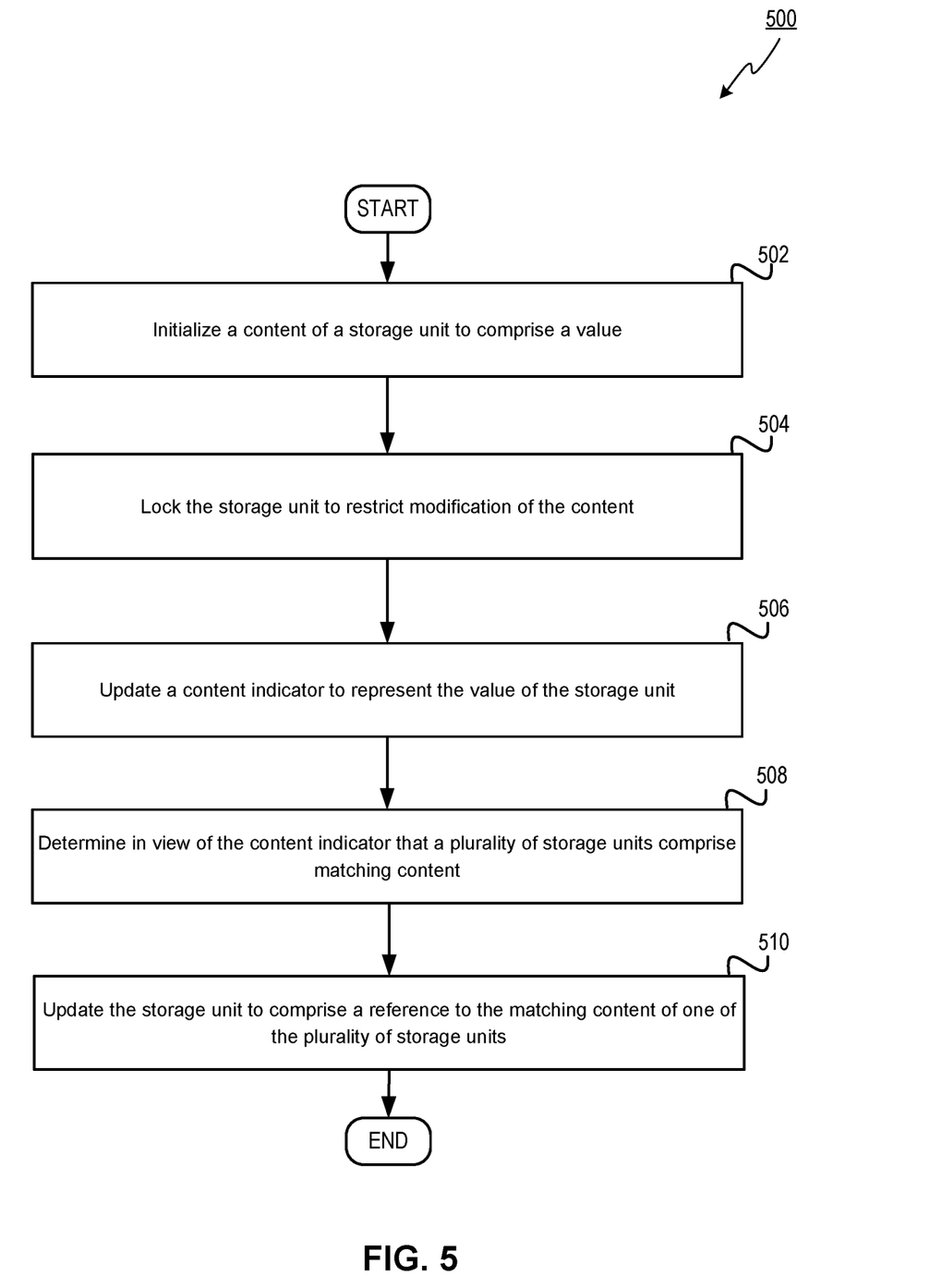
FIG. 5 depicts a flow diagram of another example method for performing data deduplication using content indicators, in accordance with one or more aspects of the present disclosure.

FIG. 5 depicts a flow diagram of an illustrative example of a method 500 for performing data duplication of a storage device using content indicators, in accordance with one or more aspects of the present disclosure. Method 500 may be similar to method 300 and may be performed in the same or a similar manner as described above in regards to FIG. 3. Method 500 may be performed by processing devices of a server device or a client device and may begin at block 502.

At block 502, the processing device may initialize a content of a storage unit to comprise a value. The value may be provided by a virtual machine, a hypervisor, a hardware device (e.g., hardware configuration), or a combination thereof. Initializing the content of the storage unit may involve assigning a default value to the content of the storage unit and subsequently creating a content indicator that indicates the storage unit includes the default value. In one example, initializing the content of the storage unit may occur prior to responding to the request to initialize the portion of the data storage. In another example, initializing the content of the storage unit may occur after responding to the request with the updated reference to the storage unit.

At block 504, the processing device may lock the storage unit to restrict modification of the content. Locking the storage unit may involve restricting access of the requesting entity and one or more other entities to the storage unit. Restricting access to a storage unit may involve restricting read access, write access, other access, or a combination thereof. In one example, locking the storage unit may involve write protecting the storage unit so that an entity is able to read the storage unit but may not be able to write to (e.g., modify) the storage unit. Locking a storage unit may enable the computing system to ensure that the initialized content of the storage unit remains unchanged until a subsequent modification request is received and processed (e.g., reduplication). In one example, the processing device may respond to a request to initialize the portion of data storage with a reference to the locked storage unit.

At block 506, the processing device may update a content indicator to represent the value of the content of the storage unit. The content indicator may be stored at a location in data storage that is separate from the content of the storage unit. In one example, the content indicator comprises a binary indicator that indicates whether the content of the storage unit comprises the value, wherein the value comprises multiple bits that all comprise zeros. In another example, the content indicator comprises a data pattern and the content of the storage unit comprises multiple instances of the data pattern. The data pattern may include a bit value, a hexadecimal value, or a word value. In either example, updating the content indicator to represent the value may occur prior to responding to the request to initialize the portion of data storage.

At block 508, the processing device may determine in view of the content indicator that a plurality of storage units include matching content. The determination may involve analyzing the values of the content indicators to determine the values of the corresponding storage units match. The processing device may first identify matching content indicators by comparing a value of a content indicator (e.g., state or data pattern) with values of one or more other content indicators. Once matching content indicators are identified, the processing device may store an indication of which storage units contain matching content. The content within storage units may be considered matching even though they may not have identical data since storage units may include additional content (e.g., unused space, padding, metadata). In one example, the determination may involve analyzing (e.g., scanning/comparing) content indicators of the storage units without accessing (e.g., scanning/comparing) content of the plurality of storage units.

At block 510, the processing device may update the storage unit to include a reference to the matching content of one of the plurality of storage units. The plurality of storage units that comprise the matching content may be duplicate memory pages and updating the storage unit to include a reference to the matching content may reduce data storage occupied by the duplicate memory pages. Updating the reference may involve replacing the reference (e.g., internal pointer) of the storage unit with a reference that points to the underlying content (e.g., physical storage location) of one of the plurality of storage units that comprise the matching content. In one example, the storage unit may be a virtual storage unit that references a physical storage unit, and wherein updating the storage unit to comprise a reference to the matching content comprises updating the virtual storage unit to reference a physical storage unit of the one of the plurality of storage units that comprises the matching content. When the storage units comprise guest memory pages, updating the reference of the storage unit may involve updating a guest memory page from a first address in a host memory to a second address in the host memory, wherein the second address corresponds to the one of the plurality of storage units that comprise the matching content. In one example, updating the reference of the storage unit may also or alternatively involve updating a page table entry and invalidating a corresponding entry within a translation lookaside buffer, wherein the page table entry corresponds to the storage unit and after the invalidating comprises a pointer to a physical address of the one of the plurality of storage units that comprise the matching content. Responsive to completing the operations described herein above with references to block 510, the method may terminate.

Figure 6:
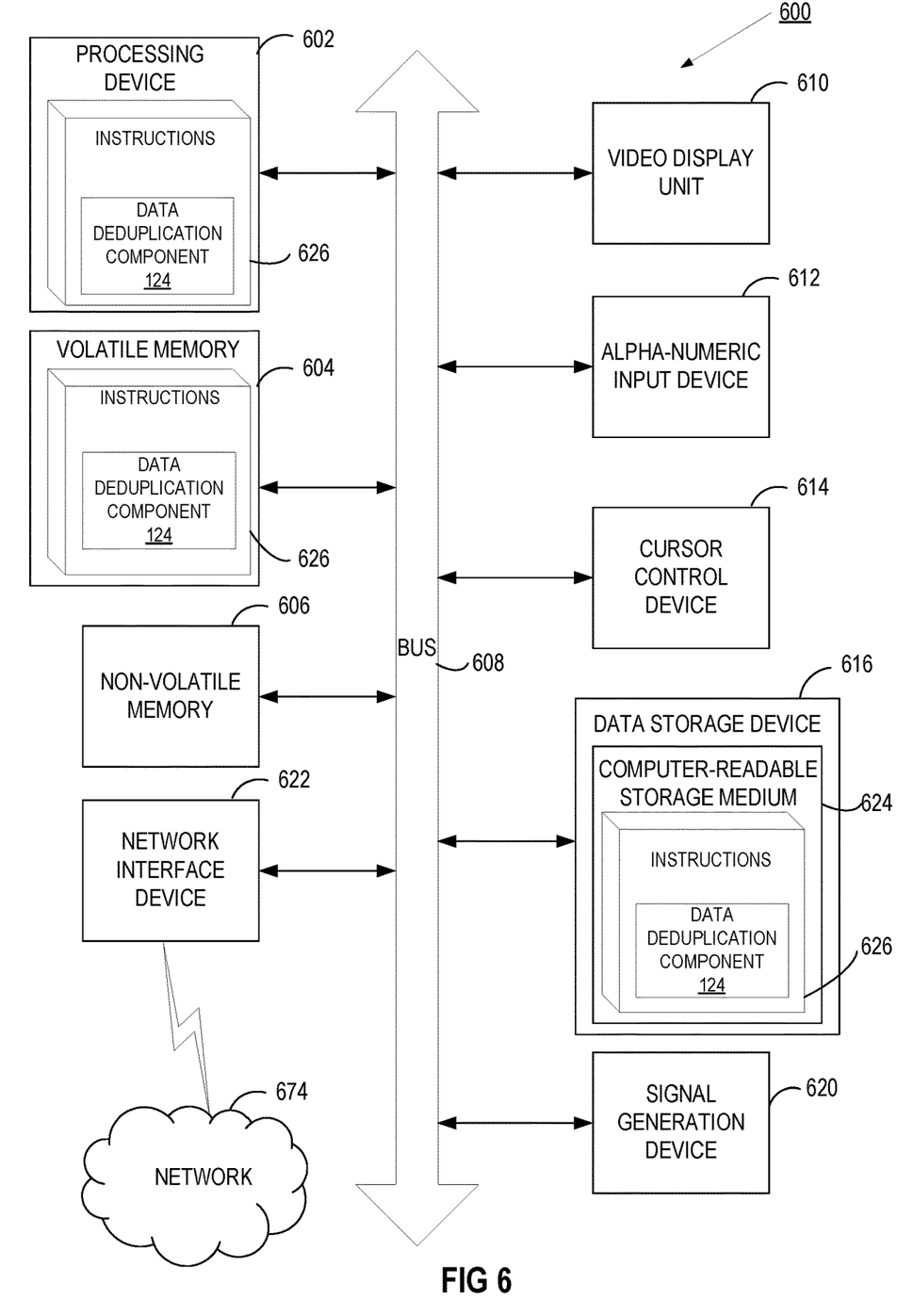
FIG. 6 depicts a block diagram of an illustrative computing device operating in accordance with the examples of the present disclosure.

FIG. 6 depicts a block diagram of a computer system operating in accordance with one or more aspects of the present disclosure. In various illustrative examples, computer system 600 may correspond to computer systems 100 or 200 of FIGS. 1 and 2 respectively. The computer system may be included within a data center that supports virtualization. Virtualization within a data center results in a physical system being virtualized using virtual machines to consolidate the data center infrastructure and increase operational efficiencies. A virtual machine (VM) may be a program-based emulation of computer hardware. For example, the VM may operate based on computer architecture and functions of computer hardware resources associated with hard disks or other such memory. The VM may emulate a physical computing environment, but requests for a hard disk or memory may be managed by a virtualization layer of a computing device to translate these requests to the underlying physical computing hardware resources. This type of virtualization results in multiple VMs sharing physical resources.

In certain implementations, computer system 600 may be connected (e.g., via a network, such as a Local Area Network (LAN), an intranet, an extranet, or the Internet) to other computer systems. Computer system 600 may operate in the capacity of a server or a client computer in a client-server environment, or as a peer computer in a peer-to-peer or distributed network environment. Computer system 600 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 600 may include a processing device 602, a volatile memory 604 (e.g., random access memory (RAM)), a non-volatile memory 606 (e.g., read-only memory (ROM) or electrically-erasable programmable ROM (EEPROM)), and a data storage device 616, which may communicate with each other via a bus 608.

Processing device 602 may be provided by one or more processors such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 600 may further include a network interface device 622. Computer system 600 also may include a video display unit 610 (e.g., an LCD), an alphanumeric input device 612 (e.g., a keyboard), a cursor control device 614 (e.g., a mouse), and a signal generation device 620.

Data storage device 616 may include a non-transitory computer-readable storage medium 624 on which may store instructions 626 encoding any one or more of the methods or functions described herein, including instructions for implementing methods 300 or 500 and for encoding data deduplication component 124 of FIGS. 1 and 2.

Instructions 626 may also reside, completely or partially, within volatile memory 604 and/or within processing device 602 during execution thereof by computer system 600, hence, volatile memory 604, and processing device 602 may also constitute machine-readable storage media.

While computer-readable storage medium 624 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and computer program components, or in computer programs.

Unless specifically stated otherwise, terms such as "initiating," "transmitting," "receiving," "analyzing," or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and may not have an ordinal meaning according to their numerical designation.

Examples described herein also relate to an apparatus for performing the methods described herein. This apparatus may be specially constructed for performing the methods described herein, or it may comprise a general purpose computer system selectively programmed by a computer program stored in the computer system. Such a computer program may be stored in a computer-readable tangible storage medium.

The methods and illustrative examples described herein are not inherently related to any particular computer or other apparatus. Various general purpose systems may be used in accordance with the teachings described herein, or it may prove convenient to construct more specialized apparatus to perform methods 300 and/or each of its individual functions, routines, subroutines, or operations. Examples of the structure for a variety of these systems are set forth in the description above.

The above description is intended to be illustrative, and not restrictive. Although the present disclosure has been described with references to specific illustrative examples and implementations, it will be recognized that the present disclosure is not limited to the examples and implementations described. The scope of the disclosure should be determined with reference to the following claims, along with the full scope of equivalents to which the claims are entitled.

What is claimed is:

1. A method comprising:
   receiving a request to initialize a portion of memory for a virtual machine, wherein the portion of memory comprises a memory storage unit;
   modifying a content of the memory storage unit to comprise an initialization value;
   updating, by a hypervisor, a content indicator to represent the initialization value of the memory storage unit;
   determining, by the hypervisor, in view of the content indicator that a plurality of memory storage units comprise matching content; and
   updating the memory storage unit to comprise a reference to the matching content of one of the plurality of memory storage units.

2. The method of claim 1, wherein receiving the request to initialize the portion of the data storage comprises receiving, by the hypervisor, a request from the virtual machine to allocate memory, and wherein modifying the content of the memory storage unit to comprise the initialization value is performed by the hypervisor.

3. The method of claim 2, wherein the content indicator is accessible to the hypervisor and is inaccessible to the virtual machine.

4. The method of claim 1, wherein the plurality of memory storage units that comprise the matching content are duplicate memory pages, and wherein updating the memory storage unit to comprise the reference to the matching content reduces physical data storage occupied by the duplicate memory pages.

5. The method of claim 1, further comprising:
locking the memory storage unit after the modifying the content to comprise the initialization value, wherein the locking comprises write protecting the memory storage unit; and
responding to the request to initialize the portion of memory with a reference to the locked memory storage unit.

6. The method of claim 1, wherein updating the content indicator to represent the initialization value occurs prior to responding to the request to initialize the portion of memory.

7. The method of claim 1, wherein determining that the plurality of memory storage units comprise matching content comprises analyzing a plurality of content indicators for the plurality of memory storage units without accessing content of the plurality of memory storage units.

8. The method of claim 1, wherein the content indicator comprises a binary indicator that indicates whether the content of the memory storage unit comprises the initialization value, wherein the initialization value comprises multiple bits that all comprise zeros.

9. The method of claim 1, wherein the content indicator comprises a data pattern and wherein the content of the memory storage unit comprises multiple instances of the data pattern, wherein the data pattern comprises a bit value, a hexadecimal value, or a word value.

10. The method of claim 1, wherein the memory storage unit comprises a virtual memory storage unit that references a physical memory storage unit, and wherein the updating the memory storage unit to comprise a reference to the matching content comprises updating the virtual memory storage unit to reference a physical memory storage unit of the one of the plurality of memory storage units that comprise the matching content.

11. The method of claim 1, wherein updating the memory storage unit comprises updating a guest memory page from a first address in a host memory to a second address in the host memory, wherein the second address corresponds to the one of the plurality of memory storage units that comprise the matching content.

12. The method of claim 1, wherein updating the memory storage unit to comprise a reference to the matching content further comprises updating a page table entry and invalidating a corresponding entry within a translation lookaside buffer, wherein the page table entry corresponds to the memory storage unit and the invalidating pertains to a pointer to a physical address of the one of the plurality of memory storage units that comprise the matching content.

13. A system comprising:
a memory;
a processing device operatively coupled to the memory, the processing device to:
receive a request to initialize a portion of memory for a virtual machine, wherein the portion of memory comprises a memory storage unit;
modify a content of the memory storage unit to comprise an initialization value;
update, by a hypervisor, a content indicator to represent the initialization value of the memory storage unit;
determine, by the hypervisor, in view of the content indicator that a plurality of memory storage units comprise matching content; and
update the memory storage unit to comprise a reference to the matching content of one of the plurality of memory storage units.

14. The system of claim 13, wherein the hypervisor receives the request of the virtual machine and modifies the content of the memory storage unit to comprise the initialization value.

15. The system of claim 14, wherein the content indicator is accessible to the hypervisor and is inaccessible to the virtual machine.

16. The system of claim 13, wherein the plurality of memory storage units that comprise the matching content are duplicate memory pages, and wherein updating the memory storage unit to comprise the reference to the matching content reduces physical data storage occupied by the duplicate memory pages.

17. A non-transitory machine-readable storage medium storing instructions which, when executed, cause a processing device to:
initialize memory for a virtual machine, wherein the memory comprises a memory storage unite comprising a value;
lock the memory storage unit to restrict modification of the value;
update, by a hypervisor, a content indicator to represent the value of the memory storage unit;
determine, by the hypervisor, in view of the content indicator that a plurality of memory storage units comprise matching content; and
update the memory storage unit to comprise a reference to the matching content of one of the plurality of memory storage units.

18. The non-transitory machine-readable storage medium of claim 17, wherein the hypervisor receives the request of the virtual machine and modifies the memory storage unit to comprise the value.

19. The non-transitory machine-readable storage medium of claim 18, wherein the content indicator is accessible to the hypervisor and is inaccessible to the virtual machine.

20. The non-transitory machine-readable storage medium of claim 17, wherein the plurality of memory storage units that comprise the matching content are duplicate memory pages, and wherein updating the memory storage unit to comprise the reference to the matching content reduces physical data storage occupied by the duplicate memory pages.

* * * * *